United States Patent Office 3,483,005
Patented Dec. 9, 1969

3,483,005
IRRADIATION WITH CO₂ UNDER PRESSURE
Walter M. Urbain, East Lansing, Mich., and Joseph L. Shank, Matteson, and Floyd L. Kauffman, Palos Park, Ill., assignors to Swift & Company, Chicago, Ill., a corporation of Illinois
No Drawing. Filed Oct. 31, 1966, Ser. No. 590,493
Int. Cl. B65b 55/08
U.S. Cl. 99—217     6 Claims

ABSTRACT OF THE DISCLOSURE

Method of sterilizing food products which are susceptible to the development of flavor degradation when exposed to high-energy ionizing radiation, and comprising subjecting the food products to an atmosphere of pressurized carbon dioxide and exposing the food products to relatively low-energy ionizing radiation.

---

This invention relates to a process for preserving food products. More particularly, the invention relates to the sterilization of food products which are susceptible to the development of flavor degradation when exposed to high-energy ionizing radiation.

Irradiation has previously been used to sterilize fresh foodstuffs such as meat for storage for indefinite periods at room temperatures. The ionizing radiation used has been either of the beta-ray (high-speed electrons) or gamma ray type, and dosages have generally exceeded about two megarads. The term "megarad" as used herein refers to a dose of ionizing radiation which produces an energy absorption of $100 \times 10^6$ ergs per gram of irradiated substance. One megarad is equal to about 1.2 megareps, the older unit for measuring ionizing radiation. Although the earliest irradiation processes produced substantially sterile products, they did not produce marketable products, since foodstuffs so treated although retaining their good appearance have had an unsatisfactory flavor. That is, they have a scorched or burned taste sometimes defined as a flavor similar to that of the "odor of a wet dog." This off-flavor is very difficult to mask and makes the taste of meat so sterilized unacceptable to the human palate. It has heretofore been proposed to overcome this drawback by reducing the sterilizing dosage substantially below one megarad, and subsequently protecting the meat by packaging in a gaseous chemical atmosphere. This process eliminates some of the undesirable bacteria and spores in the meat, but does not result in sterilization of the meat.

It has now been found that a sterile food product can be produced without flavor degradation by subjecting foodstuffs to an atmosphere of carbon dioxide under super-atmospheric pressure and exposing the foodstuffs to relatively low radiation dosages. This method results in a truly sterile food product which is characterized by freedom from spoilage, extended storage life, freedom from discoloration, and substantially unimpaired flavor characteristics.

Accordingly, it is an object of our invention to provide a simple and efficient process for irradiating food products which will prevent the development of off-flavors.

Another object of the invention is to provide a process for irradiating meat products which will result in sterile meat having desirable flavor characteristics.

Further objects and advantages will appear from the following description of the invention.

The present invention generally relates to a process for the preservation of food products which includes subjecting the food products of pressurized carbon dioxide and exposing the food products to high-energy ionizing radiation.

The ionizing penetrating radiation which can be employed in the process of this invention includes beta and gamma rays and X-rays having an energy falling within the range of $10^{-3}$ mev. up to about 15 mev. Suitable high-energy sources includes radioactive materials, Van de Graaff accelerators, resonance-transformer-type cathode ray machines, linear electron beam accelerators, atomic piles, X-ray machines, insulating core transformers, dynamitrons, betatrons, and neutron sources. The upper limit on the amount of radiation useful in the process is determined by the type of food product being sterilized. Generally, meat products should receive less than about 2.0 megarads. The lower level of radiation is determined by bacteriological analysis and for meat products should be at least .85 megarad.

It is essential to the practice of the invention that the foodstuff be subjected to an atmosphere of pressurized carbon dioxide for time periods sufficient to cause maximal bacterial destruction upon exposure to low level radiation. Usually time periods from 3 hours to 24 hours produce desired results. Desirable pressures range from about 15 p.s.i.g. to about 120 p.s.i. although pressure up to 900 p.s.i. have been shown to be very effective. Pressures herein are expressed as gauge pressures. The higher pressures are especially suitable for killing clostridial spores that are not easily destroyed by irradiation alone. However, pressures below 120 p.s.i. in combination with radiation are effective and present fewer equipment and packaging problems.

In treating meat, it is sometimes desirable to heat the meat to a temperature from 140 to 180° F. for several minutes to inactivate enzymes. This deactivation step is desirable because it minimizes biochemical deterioration of meat tissue attributed to intrinsic meat enzymes and therefore aids in preserving a fresh, wholesome flavor and appearance.

Although no particular pretreatment of the foodstuffs before exposure to carbon dioxide and irradiation is required, it has been found that satisfactory results may be obtained when the foodstuff to be irradiated is hermetically enclosed within containers, for instance cans. The foodstuff may be inserted into the can or other container, which is subsequently vacuumized and filled with a pressurized atmosphere of carbon dioxide. Thereafter, the can and contents are subjected to high-energy ionizing radiation.

The following examples of the present invention are given by way of illustration only and are not to be construed as limiting the invention.

EXAMPLE I

Fresh ground beef and enzyme inactivated (heated to 170° F.) ground beef were placed into pressure cans. Some samples were inoculated with a mixture of E. coli, S. durans bacteria (aerobic) and Clostridia 3679 spores (Putrefactive Anaerobe) and other samples were not inoculated. The cans were closed, vacuumized and backfilled to a total pressure of 120 lbs. with carbon dioxide gas. After this processing, half of the cans were irradiated with a gamma source using one million rads and the other half were not irradiated. Some of the samples were placed in storage at 100° F. for bacterial examination after various periods of time. Table I shows the bacterial population after 2, 7, and 24 days at 100° F. Even under these adverse conditions, and in spite of heavy inoculation those samples treated with carbon dioxide gas and irradiation were sterile under the usage of the term as defined by the fact that "the number of bacteria found in . . . normal meat are consistently low, generally in the range of 100 to 1,000 cells per gram." Shank, J. L.; Silliker, J. H., and Goeser, P. A., "The Development of a Nonmicrobial Off-Condition in Fresh Meat," Applied Microbiology, vol. 10, pp. 240–246, 1961. The product subjected to the carbon dioxide atmosphere and 1 megarad of radiation energy had a desirable color and flavor at the end of the 24-day storage period. In the table and examples, data concerning bacteria and spores are given on the basis of count per gram of meat.

EXAMPLE II

Raw beef in the form of ⅛ inch chunks was inoculated with PA spores, Clostridia, 3679. Subsequently, the beef was heated to approximately 165° F. for about 6 minutes to inactivate the enzymes present in the meat. (This heating also eliminates certain types of bacteria but not the spores and other heat resistant types of bacteria normally present in meat.) Before treatment in accordance with the invention, the initial counts were 23,000 total and 1,000 PA spores as determined by standard bacteriological procedures. (Total count in Brain-Heart Infusion Agar, spores in Peptone-Colloid broth.) The beef was subjected to an atmosphere of carbon dioxide at 15 p.s.i. for 18 hours and exposed to one megarad of irradiation. Following this treatment the meat had a total count of less than 100 and a PA count of less than one. Certain samples of the meat were stored at 100° F. for sixteen days in a sterile container. After this storage period, the total bacteria count was still less than one hundred and the PA count was less than one. The beef after storage had a desirable flavor and appearance.

EXAMPLE III

Defatted soybean meal was suspended in water to give a 30% slurry. This slurry was inoculated with 5 food poisoning strains of Salmonella at a $10^4$ per gram level and then packaged in small tins. Part were sealed under a $CO_2$ atmosphere of 100 p.s.i. Some of the $CO_2$-containing tins and some tins not containing $CO_2$ were irradiated with 0.5 megarad. All were analyzed after 24 hours storage at 37° C. with the following results:

Total count (per gram)
Control _____ 30,800
$CO_2$ only _____ 8,500
Irradiation only _____ 1,400
$CO_2$ and Irradiation _____ <100

Obviously many modifications and variations of the invention as hereinbefore set forth may be made without departing from the spirit and scope thereof, and therefore only such limitations should be imposed as are indicated in the appended claims.

We claim:
1. An irradiation method for sterilizing meat which normally tends to undergo flavor degradation when exposed to high-energy ionizing radiation without substantially altering the flavor thereof, which comprises: subjecting said meat to a carbon dioxide atmosphere of from about 15 p.s.i.g. to about 900 p.s.i.g. for a period of time sufficient to cause maximal bacterial destruction upon exposure to low level radiation, and irradiating said meat with ionizing radiation at dosages in the range of from about 0.85 to about 2.0 megarads for a period of time sufficient to sterilize said meat.

2. The method of claim 1 including the prior step of heating said meat to a temperature sufficient to inactivate the enzymes of said meat.

3. The method of claim 1 wherein said meat is hermetically sealed in a container prior to exposure to radiation.

4. The method of claim 1 wherein the pressure of said carbon dioxide atmosphere is from 30 to about 120 p.s.i.

5. The method of claim 1 wherein the meat is beef.

6. The method of claim 1 wherein the ionizing radiation dosage is in the range of from about 1.7 to about 2.0 megarads.

References Cited

UNITED STATES PATENTS

| Re. 23,195 | 2/1950 | Brasch | 21—54 |
|---|---|---|---|
| 2,965,494 | 12/1960 | Williams | 99—157 |
| 2,973,271 | 2/1961 | Baldwin et al. | 99—125 |
| 3,057,735 | 10/1962 | Ottke et al. | 99—157 |
| 3,093,489 | 6/1963 | Alexander et al. | 99—217 |
| 3,141,777 | 7/1964 | Guidarelli et al. | 99—98 |

OTHER REFERENCES

McCulloch, Disinfection and Sterilization, 1945, pages 241–242.

RAYMOND N. JONES, Primary Examiner

STEPHEN B. DAVIS, Assistant Examiner

U.S. Cl. X.R.

99—187, 214